United States Patent
Takemura

(10) Patent No.: US 6,478,893 B1
(45) Date of Patent: Nov. 12, 2002

(54) ROLLING BEARING AND METHOD OF MACHINING ROLLING ELEMENT OF THE BEARING

(75) Inventor: Hiromichi Takemura, Yokohama (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/673,508

(22) PCT Filed: Feb. 22, 2000

(86) PCT No.: PCT/JP00/01007
§ 371 (c)(1),
(2), (4) Date: Oct. 17, 2000

(87) PCT Pub. No.: WO00/50781
PCT Pub. Date: Aug. 31, 2000

(30) Foreign Application Priority Data

Feb. 22, 1999 (JP) ............................. 11-043054
Jul. 21, 1999 (JP) ............................. 11-206690

(51) Int. Cl.[7] ............................. C21D 9/36; C21D 8/00
(52) U.S. Cl. .................... 148/320; 148/654; 148/663; 384/492; 384/912
(58) Field of Search ................. 148/906, 654, 148/663, 579, 320, 572; 384/494, 912

(56) References Cited

U.S. PATENT DOCUMENTS

| | | | |
|---|---|---|---|
| 3,682,519 A | | 8/1972 | Shepelyakovsky et al. |
| 4,659,241 A | * | 4/1987 | Bamberger et al. ......... 148/319 |
| 5,147,140 A | * | 9/1992 | Murakami et al. .......... 384/492 |

FOREIGN PATENT DOCUMENTS

| | | |
|---|---|---|
| CN | 1195033 | 10/1998 |
| DE | 4311507 | 11/1994 |
| DE | 19815483 | 1/1999 |
| GB | 2 317 397 | 3/1998 |
| JP | 61-270330 | 11/1986 |
| JP | 3-173714 | 7/1991 |
| JP | 04054312 | 2/1992 |
| JP | 5-195069 | 8/1993 |
| JP | 5-195070 | 8/1993 |
| JP | 6-264929 | 9/1994 |
| JP | 7-190072 | 7/1995 |
| JP | 11-61337 | 3/1999 |

OTHER PUBLICATIONS

English translation of German Office Action dated Oct. 18, 2001.
Okamoto, "Dynamic Load Capacity of Rolling Bearing/Roller Bearing", Seibunsha Co., Ltd., Sep. 1988.
Abe et al., "EP Steel (A Superlong–Life, High Reliability Bearing Steel)", NSK Technical Journal, No. 652, pp. 1–8 (1992).
Goto, "Several Problems for the Manufacture of Balls", Journal of Japanese Plastic Working Society, vol. 39, No. 226 (1988–3).

* cited by examiner

*Primary Examiner*—Deborah Yee
(74) *Attorney, Agent, or Firm*—Crowell & Moring LLP

(57) ABSTRACT

In rolling bearings used in a circumstance undergoing high temperature, large loads and large vibrations, it has been known that early flaking phenomenon more tending to occur in the rolling element than in the bearing ring. In view of the above, according to the present invention, a rolling element with improved rolling contact fatigue resistance can be obtained while keeping hardness by devising a combination of mechanical surface hardening treatment and a heat treatment to a surface of a rolling element. A rolling bearing of long life can be provided even under large loads and large vibrations by incorporating the rolling element. That is, according to the present invention, a surface hardening treatment is applied after quenching and tempering to a rolling element to provide a surface with a residual compressive strength and, subsequently, secondary tempering and then finish grinding are applied to make the amount of residual austenite in the surface layer to 0 to 15%, the final residual compressive strength value to −600 to −1200 MPa and a working strain relieving degree to 10 to 60%. This can provide a long life rolling bearing under large loads and large vibrations.

18 Claims, 2 Drawing Sheets

ROLLING BEARING AND METHOD OF MACHINING ROLLING ELEMENT OF THE BEARING

BACKGROUND OF THE INVENTION

The present invention relates to a rolling bearing and, more in particular, it relates to rolling bearings used in circumstances undergoing high temperature, large loads and large vibrations, for example, ball bearings for use in transmissions, hub units and engine auxiliaries (such as alternators, intermediate pulleys and solenoid clutches) of automobiles, guide roll bearings and backup roll bearings for use in iron and steel making, or rolling bearings suitable to roller bearings such as those used in railway vehicles, as well as a method of working rolling elements of them.

In the calculation for the life of rolling bearings, it has been known to determine a basic dynamic rating load of bearings while assuming that a probability for the occurrence of flaking in two objects in contact with each other (bearing ring and rolling element) such as a fixed ring and a rolling element, and a rotational ring and a rolling element is identical between both of them, and combining a basic load capacity of the rotational ring and the basic load capacity of the fixed ring (for example, in "Dynamic Load Capacity of Rolling Bearing Roller Bearing" written by Junzo Okamoto, printed from Seibunsha Co. Ltd.).

On the other hand, as one of countermeasures for improving the life of rolling bearings, cleanliness has been improved for the material of the bearing ring, and non-metal inclusions in steels have been decreased to greatly improve the rolling life in recent years (NSK Technical Journal, No. 652 (1992), Pages 1–8).

In the same manner, cleanliness has also been improved in the coil materials used for the rolling element to improve the reliability. However, the probability for the presence of non-metal inclusions at the central portion of the coil material tends to be higher compared withoursolling bearings not using the central portion of bar materials. Accordingly, in a circumstance where bearings undergo large loads and large vibrations, early flaking may sometimes occur in the rolling element.

As the prior art for improving the indentation resistance and the rolling life of the rolling element, there has been a technique, as described in Japanese Patent Examined Publication No. Hei 1-12812, of applying quenching and tempering to a rolling element and then applying a mechanical surface hardening treatment by air jet peening to cause plastic deformation to the surface layer thereby obtaining a large residual compressive stress layer to improve the fatigue life and improve the hardness thereby reducing the occurrence of surface flaws during handling of the rolling element.

Further, as a technique for increasing the life of steel balls for grease-sealed bearings, there has been reported, as disclosed in Japanese Patent Unexamined Publication No. Hei 3-173714, a technique of controlling the residual tensile strength in the direction of the thickness in the surface layer to 150 MPa at the maximum and, preferably, from 50 to 150 MPa in a case where a work hardening treatment is applied to the surface of a steel ball to result in a difference of hardness of HOURSC 1 or higher between the inside and the surface layer of the steel ball, thereby suppressing intrusion and accumulation of hydrogen into tensile stress exerting regions to prevent occurrence of fatigue cracking and flaking.

Further, as balls for use in ball bearings and a manufacturing method thereof, Japanese Patent Unexamined Publication No. Hei 6-264929 discloses a prior art of applying a tempering treatment after the surface hardening treatment for preventing aging deterioration of the accuracy on the surface of the ball thereby preventing aging deterioration of the acoustic characteristics of the ball bearings.

However, in a case of use in a working circumstance under large loads and large vibrations, since a sort of plastic working corresponding to contact fatigue such as mechanical surface hardening by air jet peening has already been applied to a rolling element as shown in Japanese Patent Examined Publication No. Hei 1-12812, excess plastic deformation of the surface layer proceeds in an accelerated manner in a working circumstance where the rolling element undergoes similar large loads and large vibrations and, as a result, this tends to cause early flaking.

Further, as disclosed in Japanese Patent Unexamined Publication No. Hei 3-173714, in the case of the technique of suppressing intrusion of hydrogen into the tensile stress exerting regions by controlling the maximum value of the residual tensile stress in the surface layer, to prevent occurrence of fatigue cracking and flaking, the maximum value of the residual tensile stress occurs near the position for the maximum shearing stress and, accordingly, propagation of cracks is further accelerated under large loads and large vibrations in a state where the maximum residual tensile stress of 150 MPa is loaded, so that the effect of extending the life can not be expected.

Further, in the technique disclosed in Japanese Patent Unexamined Publication No. Hei 6-264929, for coping with the acoustic problem caused by aging deterioration of the accuracy on the surface of a ball for use in HDD when used in a circumstance under small load and high speed rotation, rough grinding is applied after quenching/tempering treatment and, further, a tempering treatment is applied again after the surface hardening treatment followed by finish grinding. It takes no consideration for relieving the residual work strain which is most important for flaking under large loads and large vibrations that is the problem in the present invention, to still leave a room for improvement in this respect.

Furthermore, Plasticity and Working (Journal of Japanese Plastic Working Society), vol. 39, No. 446 (1988–3) shows, in "Several Problems for the Manufacture of Balls", that grinding for correcting the shape of a steel ball (ball) and peening for improving the strength are required regarding the effect of the residual stress on the fatigue life but excess working may deteriorate the fatigue life, and states that the subject resides in the optimal peening.

The present invention has been accomplished for overcoming such drawbacks in the prior art and it is an object thereof to obtain a rolling element with improved resistance to rolling contact fatigue while keeping the hardness by devising a combination of a mechanical surface hardening treatment and a heat treatment to a rolling element of a rolling bearing and to provide a rolling bearing of long life even under large loads and large vibrations, by incorporating the rolling element described above.

More specifically, it intends to obtain a rolling element improved with the indentation resistance and rolling contact fatigue resistance by controlling the residual stress on the surface of a rolling element and, optionally, defining a relation with a residual stress value at a position for 2% diameter depth below the surface to optimize the residual stress distribution, thereby providing a rolling bearing having a long rolling life even under large loads and large vibrations.

SUMMARY OF THE INVENTION

Present invention relates to a rolling bearing capable of attaining such an object and a method of working a rolling element thereof.

A rolling bearing of the present invention has a feature in a rolling bearing which is used with a plurality of rolling elements being disposed between a fixed ring and a rotational ring, wherein the amount of residual austenite in the surface layer of the rolling element is from 0 to 15 vol %, a final residual compressive stress value is from −600 to −1200 MPa and a working strain relieving degree is from 10 to 60%.

That is, the rolling element is manufactured from a coil material and, in a case of the coil material, since a probability for the presence of non-metal inclusions in the central portion is higher than that in the bearing ring, flaking tends to occur particularly in the rolling element. In view of the above, it is effective for extending the life to prevent occurrence, particularly, of rolling contact fatigue cracking or flaking by controlling the residual stress in the rolling element as described above.

In this case, numerical values are defined by the reasons described below. When the amount of the residual austenite in the surface layer of the rolling bearing exceeds 15 vol %, the indentation characteristic is deteriorated tending to cause flaws on the surface. Further, when the final residual compressive stress value at the surface of the rolling element is less than −600 MPa, the effect of suppressing the crack propagation is reduced and, on the other hand, large residual tensile strength exerts in the radial direction when it exceeds −1200 MPa. Therefore, in each of the cases, crack propagation leading to flaking is promoted. Further, if the working strain relieving degree is less than 10%, the plastic strain generated by excessive working can not be removed sufficiently and, on the other hand, the effect of the applied residual compressive stress is eliminated if it exceeds 60%, to deteriorate the performance of the flaking resistance.

In the rolling bearing according to the present invention, in the value for the residual compressive stress ($\sigma_D$) at the depth of 2% Da as the ratio to the diameter of the rolling element from the surface of a completion product of the rolling element is −400 to −1000 MPa.

Further, the residual stress distribution can be optimized by defining a relation between a final residual compressive stress value $\sigma_S$ on the surface of the rolling element and a residual compressive stress ($\sigma_D$) at a depth of 2% Da as a ratio to the diameter of the rolling element from the surface of the completion product so as to satisfy: $|\sigma_S| \geq |\sigma_D|$, and a range of $|\sigma_D|$=400–1000 MPa.

This is because the rolling contact fatigue strength is improved by optimizing the residual stress value $\sigma_D$ at a position for 2% depth to the diameter below the surface of the rolling element within a range from −400 to −1000 MPa which is lower than the residual compressive stress value as on the surface. If the residual stress value $\sigma_D$ for 2% Da is less than −400 MPa, propagation of cracking can not be suppressed sufficiently and, on the other hand, if the value exceeds −1000 MPa, the residual stress caused by excess working is not relieved sufficiently tending to proceed the plastic deformation by rolling contact fatigue to shorten the life. While the range for $\sigma_S$ and $\sigma_D$ is selected as described above, since a relation: $\sigma_D \geq \sigma_S$ can also exist in addition to the relation as $\sigma_S \geq \sigma_D$, it is indicated by absolute values.

The present invention also relates methods of working a rolling element of rolling bearings.

The method of working a rolling element of a rolling bearing according to the present invention comprises a quenching/tempering step of applying hardening by heat treatment after quenching and tempering a rolling element made of a bearing steel, a mechanical working step of applying plastic deformation to the surface for providing a residual compressive stress on and below the surface of the rolling element after the quenching/tempering step, a secondary tempering step of relieving plastic strain after the mechanical working step, and a finishing step of finishing the surface of the rolling element to a predetermined size.

That is, the surface hardening treatment is applied to the rolling element made of the bearing steel after quenching and tempering and then the tempering treatment is applied again to relieve the working strain of the surface layer by the residual compressive strength on the surface and finish grinding is applied to improve the rolling contact fatigue under large loads and large vibrations for keeping the hardness of the surface layer.

In this case, it can be defined such that a relation between the residual compressive stress ($\sigma_1$ MPa) on the surface of the rolling element caused by plastic working strain in the mechanical working step and a residual compressive stress ($\sigma_2$ MPa) on the surface of a completion product after the finishing step satisfies: $\{(\sigma_1-\sigma_2)/\sigma_1\} \times 100\% = 10-60\%$ and provision of the plastic working strain in the mechanical working step and relieving of the plastic strain in the secondary tempering step are applied.

Then, it can be defined that the value of $\sigma_1$ is: $\sigma_1 = -900$ to −1500 MPa and the value of $\sigma_2$ is :$\sigma_2 = -600$ to −1200 MPa.

Further, it can be defined that the amount of residual austenite on the surface of a rolling element after the quenching/tempering step is : $\gamma_R = 10$ to 30 vol %, and the amount of residual austenite on the surface of the rolling element after the finish working step is : $\gamma_R = 0$ to 15 vol %.

Further, more specifically, a more preferred result can be obtained by defining that heating at 830 to 870° C., oil cooling and tempering at 130 to 160° C. are conducted in the quenching/tempering step and tempering at 150 to 240° C. is conducted in the secondary tempering step.

In the rolling element for the rolling bearing of the present invention obtained by the working method described above, the final residual compressive stress ($\sigma_1$ MPa) on the surface of the completion product of the rolling element satisfies a relation: $|\sigma_S| \geq |\sigma_D|$ and $|\sigma_D|$=40 to 1000 MPa, when indicated by the absolute value for the residual compressive stress ($\sigma_D$ MPa) at the depth of 2% Da as a ratio to the diameter of the rolling element from the surface of the completed product.

In the working method for the rolling element according to the present invention, the mechanical working step comprises charging quenched/tempered steel balls for use in a predetermined rolling bearing in a space volume of a rotating barrel box and applying plastic working strain to the surface of the steel balls by collision between each of the steel balls.

DETAILED DESCRIPTION OF THE PREFERRED EMBODIMENTS

Figure 1:
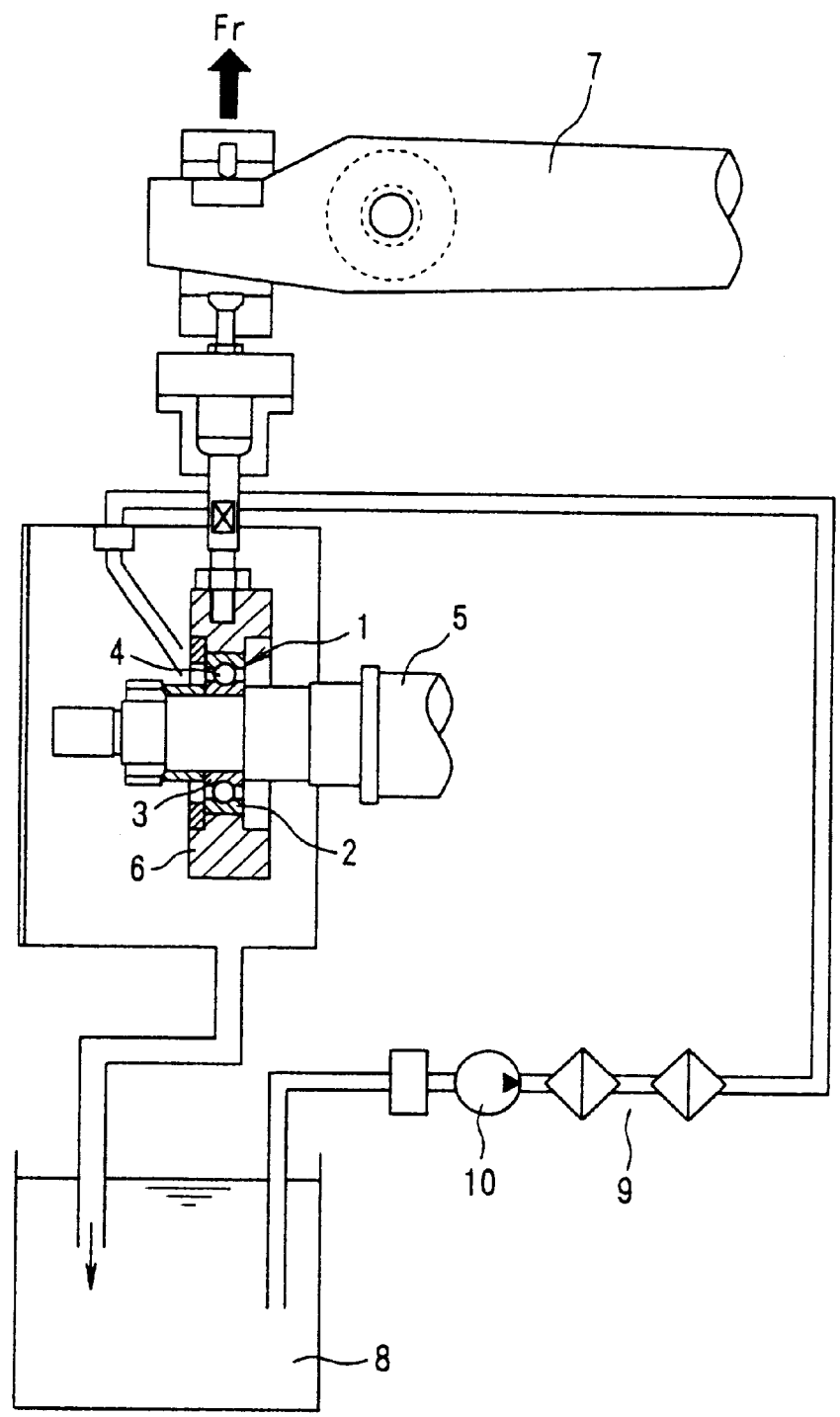
FIG. 1 is a schematic view of a life tester for a rolling bearing.

Modes of practicing the present invention is to be described.

The invention has been accomplished in view of the fact that even rolling elements of a rolling bearing made of a bearing steel at high cleanliness as a material tend to cause more early flaking than the bearing ring under large loads and large vibrations, undergoing the effect of the material composition in that impurities are difficult to be removed sufficiently as far as the core portion of the coil material.

For improving the life of a rolling element, it has been well-known that application of a mechanical surface hardening treatment to the surface of the rolling element is effective, but if the surface hardening treatment for the rolling element is applied before quenching/tempering, it is difficult to sphericalize the rolling element and the mechanical strength tends to be deteriorated after quenching.

In view of the above, in the present invention, a surface hardening treatment is applied to a rolling element after quenching/tempering, and then a tempering treatment is applied again (secondary tempering). It has been described previously that the technique of conducting tempering after applying a surface hardening treatment to a bearing rolling element has been described in Japanese Patent Unexamined Publication No. Hei 6-264929, but this intends to prevent aging deterioration for the configurational accuracy on the surface of a ball and prevent deterioration of the acoustic characteristic in a roll bearing for use in HDD, which is conducted under strict control for the relation between the temperature and the time in the tempering treatment. However, it has not been taken into a consideration at all for controlling the degree of the residual working strain by the surface hardening treatment.

On the contrary, the present invention intends to improve the life of bearings used under large loads and large vibrations, such as bearings for use in automobiles, rolling mills and railway vehicles as the target, so that it has been noted to the fact that plastic deformations proceeds during use under large loads and large vibrations if excess plastic deformation caused by the surface hardening treatment is left as it is and, as a result, this leads to early flaking. Accordingly, a great importance is attached to the consideration for removing strain by decreasing the residual compressive stress in the surface layer of the rolling element when applied with the surface hardening treatment by the secondary tempering (relieving of the residual working strain).

In the rolling element of the rolling bearing according to the present invention, an air jet shot peening disclosed, for example, in Japanese Patent Examined Publication No. Hew 1-12812 can be used suitably as the means for the surface hardening treatment. It is however not restricted only thereto but other general mechanical surface effect means can also be utilized.

The initial heat treatment applied to the rolling element in the present invention may be any ordinary treatment. Then, the secondary tempering treatment applied to the rolling element after the surface hardening treatment can be conducted at a temperature higher than the temperature of the initial tempering (primary tempering) applied next to the quenching, or it can be treated at a temperature lower than the temperature for the primary tempering. In any case, it is important to relieve the residual working strain caused in the surface hardening treatment by the secondary tempering treatment. The degree of relieving the residual working strain in this case is defined as below.

Now, assuming the residual compressive stress on the surface of the rolling element measured just after the application of the surface hardening treatment to the rolling element as an initial residual compressive stress $\sigma_1$ (MPa), and the residual compressive stress measured on the surface of the rolling element finished into a completion product by applying a secondary tempering treatment and further applying finish grinding as a final residual compressive stress $\sigma_2$ (MPa), it gives:

$$\text{Relieving degree of working strain (\%)} = |(\sigma_1 - \sigma_2)/\sigma_1| \times 100 \quad (1)$$

Further, it is assumed here that the amount of residual austenite on the treated surface after initially quenching and tempering the rolling element is $\gamma_{R1}$ and the amount of the final residual austenite in the surface of the rolling element finished into a completion product by subsequently applying a surface hardening treatment and a secondary tempering treatment and further applying finish grinding is $\gamma_{R2}$.

Referring to an example of a method of manufacturing a rolling element of a rolling bearing according to the present invention, a rolling element made of bearing steel is quenched by heating at 830 to 870° C., which is oil-cooled and then put to primary tempering at 130–160° C., for instance. The amount of the residual austenite ($\gamma_R$) present in the rolling element is from 15 to 30 vol %.

A surface hardening treatment such as an air jetting shot peening is applied to the rolling element. This forms an initial residual compressive stress $\sigma_1$ of –900 to –1500 MPa on the surface of the rolling element. By the working energy of the shot peening, the residual austenite ($\gamma_R$) at the surface of the rolling element is partially transformed into a work— induced martensitic structure, and the amount of $\gamma_R$ is reduced to 5 to 20 vol %. Then, the surface hardening treatment causes working strain.

Subsequently, a secondary tempering treatment is applied at 150 to 240° C. and then finish grinding is applied to obtain a completion product at the surface roughness of the rolling element of from 0.003 to 0.01 $\mu$m Ra. On the surface of the rolling element as the completion product (for example, steel ball for ball bearing), residual austenite ($\gamma_R$) is left being reduced to 0 to 15 vol %. Further, the value of the final residual compressive stress $\sigma_2$ on the surface of the rolling element is –600 to –1200 MPa which is decreased by 10 to 60% relative to the initial residual compressive stress $\sigma_1$ to attain stress relieving.

Thus, in the completed rolling element assembled in a rolling bearing of the present invention, the amount of residual austenite in the surface layer is from 0 to 15 vol %, the final residual compressive stress value is from –600 to –1200 MPa and the relieving degree of working strain is from 10 to 60%, which can attain the improvement of flaking life under large loads and large vibrations.

In this case, if the amount of residual austenite in the surface layer exceeds 15 vol %, the indentation characteristic is deteriorated tending to cause flaws on the surface.

Further, if the final residual compressive stress value is less than –600 MPa, the effect of suppressing crack propagation leading to flaking is small and, on the other hand, if it exceeds –1200 MPa, a large residual tensile strength exerts in the radial direction to promote crack propagation attributable to shearing stress.

Further, if the relieving degree for the working strain is less than 10%, the plastic strain caused by excessive working is not removed sufficiently and, on the other hand, if it exceeds 60%, the effect of the applied residual compressive stress is eliminated to lower the flaking resistance performance.

The advantage of the present invention is to be described concretely by way of a life test.

6206 deep groove ball bearings were used for the bearings as test specimens. In the rolling element, steel balls of ⅜ inch diameter made of bearing steel No. 2 were assembled by nine per one bearing for use.

An example of a method of manufacturing the steel ball is shown below.

At first, for the steel ball, a spherical body is formed by cold forging, then the steel ball is ground by a flushing step for removing burrs, then heated at 830 to 870° C., oil quenched and then tempered at 130–160° C. (primary tempering). Subsequently, during fine grinding, ⅜ inch steel balls at the weight of 500 kg per 1 lot are successively charged between two sheets of grooved disks of a fine grinding machine for successive circulation and ground under rotation while applying a pressure such that the deviation from the circular form of the steel ball is 5 μm or less.

Then, a surface hardening treatment is applied to the steel ball by a shot peening method.

This is conducted by charging ⅜ inch steel balls primarily tempered after the quench hardening by 5 to 250 kgf into a barrel box of 0.2 m³ of space volume, and colliding the steel balls against each other while rotating the barrel box for 100 min at 200 rpm. The amount of the steel balls charged into the barrel box and the operation time of the barrel box were changed respectively such that the residual compressive stress ($\sigma_1$) on the surface of the rolling element by the plastic working strain is from −900 to −1500 MPa and the amount of residual austenite ($\gamma_{R1}$) is from 5 to 30 vol %. That is, as the number of the steel balls charged in the barrel box is smaller, the space volume in the box increases more to increase the plastic working energy to make $\sigma_1$ higher. Further, as the barrel box is rotated for a longer period of time, the plastic working strain increases to make $\sigma_1$ higher. Therefore, ⅜ inch steel balls of examples and comparative examples can be manufactured while changing $\sigma_1$ and $\gamma_{R1}$ respectively by changing the conditions for the amount of charge and the operation time described above.

TEST EXAMPLE 1

The states of rolling elements in examples and comparative examples are shown in Table 1.

$\sigma_1$: initial residual compressive stress, $\sigma_2$: final residual compressive stress (completion product)

$\gamma_{R1}$: amount of treated residual austenite $\gamma_{R2}$: amount of final residual austenite (completion product)

In Comparative Example 1, steel balls of ordinary commercial products were used. For Examples 1 to 9 and Comparative Examples 2 to 5, steel balls relieved from working strains were manufactured respectively. Further, for Examples 10a and 10b, steel balls were manufactured by applying a secondary tempering treatment after the surface hardening treatment and the finish grinding.

Succeedingly, a life test was conducted for 6206 deep groove ball bearings incorporated with these rolling elements.

Upon life test, for preventing early flaking in inner and outer rings of the bearings, SUJ2EP steel as material of super high cleanliness developed by this company (NSK Technical Journal, No. 652, 1992, Pages 1–8) were employed and used after applying an ordinary heat treatment (quench heating at 840° C., oil cooling and then tempering at 180° C.). The surface hardness for the inner and outer rings was HOURSC 61 to 63 and the surface roughness of the inner and outer rings was 0.01 to 0.04 μm Ra. The content of the life test is as shown below.

TESTER

Conducted with lubricant oil VG68 using the tester shown in FIG. 1.

In the drawing, reference numeral 1 denotes a rolling bearing as a test specimen, 2 denotes an outer ring (fixed ring), 3 denotes an inner ring (rotational ring) and 4 denotes a rolling element. 5 denotes a shaft for mounting the rolling bearing, 6 denotes a bearing housing, 7 denotes a load shaft for applying a load from the radial direction to the test specimen, 8 denotes a lubricant tank, 9 denotes a filter and 10 denotes an oil supply pump.

TEST METHOD

The rolling bearing as the test specimen was deep groove ball bearing of bearing number 6206, the test load Fr=1600 kgf (P/C=0.8) and the number of rotation was 1000 rpm. The test was conducted each by the number of n=10.

Since nine steel balls were used per one bearing, L10 life was determined for 90 specimens. Further, the test was judged as completed at the instance the measured vibration value was five times as much as the initial vibration value, and flaking was confirmed by interrupting the test. When the measured vibration value did not reach five times the initial vibration value, the test termination time was set at 1000 hours.

TEST RESULT

The result of the test is shown in the Table 2.

In Examples 1 and 4, since the relieving degree for the working strain on the surface of the rolling element by the secondary tempering treatment was larger than that in other examples and they were 60% and 50% respectively, the L10 life was 651 hours and 852 hours respectively, which was about five times or more as long as Comparative Examples 1–5 in view of the life. Further, flaking occurred only to four and three in 90 specimens respectively.

Further, in Examples 6 and 9, the relieving degree for the working strain on the surface of the rolling element by the secondary tempering treatment was made smaller than that in other examples, which were 17% and 11% respectively. L10 life was 795 hours and 670 hours, respectively, which showed life about five times or more as long as Comparative Examples 1 to 5.

Further, in Examples 2, 3, 5, 7 and 8, since the working strain on the surface of the rolling element by the secondary tempering treatment was defined as 20 to 40%, the hardness of the rolling element was scarcely lowered and, for L10 life in each of the cases, flaking did not occur in 90 bearings when reached 1000 hours of the test termination time.

In Examples 10a and 10b, finish grinding was applied after the surface hardening treatment and then a secondary tempering treatment was applied subsequently at a temperature lower than the first tempering temperature for the dimensional stability to make the relieving degree of working strain to 58% and 25% respectively, in which the life was not changed compared with other examples and the L10 life was 782 hours and 1000 hours, respectively.

On the other hand, Comparative Example 1 is a test using ordinary steel balls and since no secondary tempering treatment was applied, the L10 life was 78 hours which was about twice as long as the calculated life, but the life value was extremely shorter compared with Examples 1 to 11. Accordingly, it can be seen that formation of the residual compressive stress by the mechanical surface hardening treatment can be effective to the effect of extending the life.

Further, in Comparative Example 2, a secondary tempering treatment was applied to provide the relieving degree of working strain of 7% but, since the strain was not relieved sufficiently, the L10 life was as short as 120 hours. This is because the residual stress by the overworking was not relieved sufficiently and, accordingly, the plastic deformation due to the rolling contact fatigue proceeded to shorten the life.

Further, in Comparative Example 3, a secondary tempering treatment was applied to make the relieving degree of working strain to 73% but, since the bearing hardness was lowered to HOURSC 58 and the residual compressive stress on the surface was also lowered to −400 MPa, the effect for the flaking resistance was not sufficient and the L10 life was as short as 75 hours.

In Comparative Examples 4, 5, since the final residual compressive stress after the surface hardening treatment was as low as −400 MPa and −300 MPa, respectively, the L10 life was shortest as 73 hours and 60 hours even if the relieving degree for working strain was sufficient as 56% and 40%.

From the foregoing result, it can be said that a rolling element of a further longer life can be provided since the working strain as a sort of contact fatigue state caused by the surface hardening treatment can be removed by 10 to 60% by applying usual rough finishing, applying a surface hardening treatment after the heat treatment and then further applying a secondary tempering in the manufacture of the rolling element.

In this case, an effect was observed in a case of the relieving degree for the surface working strain of the rolling element of 10 to 60%, a further effect of extending the life can be expected by making stress the relieving degree to 20–40%.

TEST EXAMPLE 2

Successively, examples of other tests are to be described.

The kind and the size of the tested bearings, and the material and the size of the rolling element are identical with those in Test Example 1.

Further, the temperature range for the heat treatment condition, the mechanical surface hardening treatment (shot peening), the temperature range of the secondary tempering treatment and the range for the surface roughness of the rolling element after the finish grinding are also identical with those in Test Example 1 excepting for the method of mechanical surface hardening treatment.

Table 3 shows the state of tested rolling elements in the examples and the comparative examples.

In the table:

$\sigma_S$: residual compressive stress on the surface of steel ball (identical with final residual compressive stress $\sigma_2$).

$\sigma_D$: residual compressive stress at a position for depth Da×2% below the steel ball surface (Da: steel ball diameter).

Figure 2:
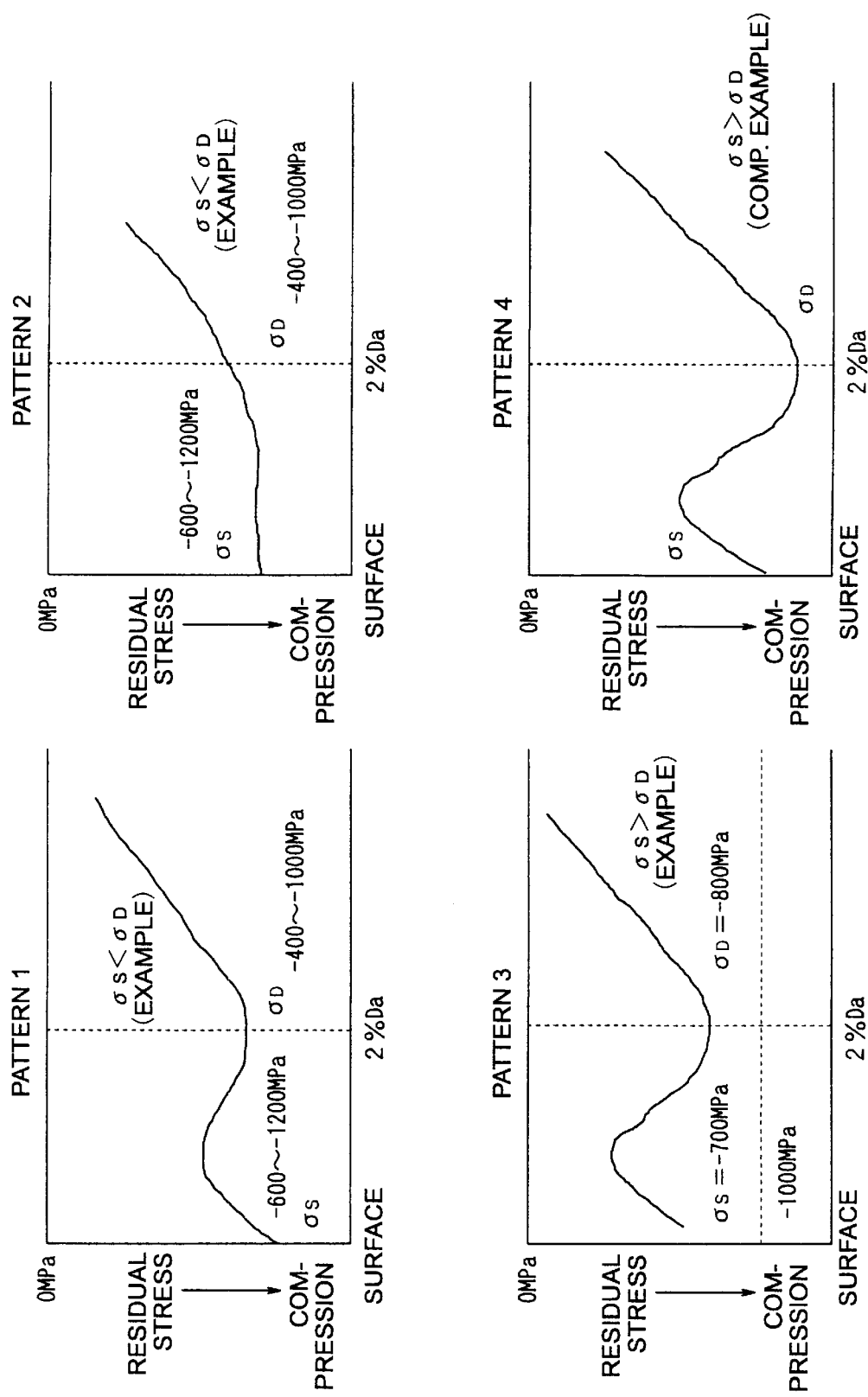
FIG. 2 is diagrams showing patterns of residual stress distribution in examples and comparative examples of rolling elements used in the test.

FIG. 2 shows distribution patterns 1–4 for the residual stress in the examples and the comparative examples.

In Comparative Example 11 steel balls of ordinary commercial products not considering the indentation resistance were used.

With respect to Examples 11–15 and Comparative Examples 12–14, identical steel balls with those in Test Example 1 relieved from working strain were manufactured respectively.

Further, for Examples 16–21 and Comparative Examples 15 and 16, steel balls of different residual stress distribution to the 2% position depth to the diameter Da of the rolling element were manufactured by decreasing the space volume than in the prior art by increasing the number of steel balls charged in a barrel box during peening, to lower the amount of energy upon collision between each of the steel balls, and making the requiring time for peening different. That is, a barrel box with a space volume as small as 0.1 m³ was used, in which 250 kg of ⅜ inch steel balls were charged and steel balls were collided against each other while rotating the barrel box for 50 to 300 minutes at 200 rpm, to make the residual compressive stress ($\sigma_2=\sigma_S$) on the surface of the rolling element after finishing to −600 to −1500 MPa and the amount of residual austenite ($\gamma_{R2}$) to 0 to 15 vol %, and the residual compressive stress ($\sigma_D$) at the depth of 2% Da as the ratio to the diameter of the rolling element from the surface of the completion product to −400 to −1000 MPa. The position for 2% Da corresponds to the peak position of the maximum shearing stress generated below the raceway surface when the steel balls were incorporated and used in the rolling bearing. For the inner and outer rings of the bearing, in the Examples and the Comparative Examples, the same SUJ2EP of the superhigh cleanliness material identical with that in Test Example 1 was used, and all of the heat treatment, surface hardness and surface roughness were made identical with those in Test Example 1, in order to prevent the early flaking.

Further, the test was conducted by using the same test apparatus as in Test Example 1, in which Test load Fr: 990 kgf (P/C =0.50)

Test temperature: 120° C.,

Number of rotation: 1000 rpm

Number of test specimens n: n=10 for each of test specimens.

Since 9 steel balls were used per one ball bearing, the L10 life was determined by 90 pieces.

Upon judgment at the end of the test, the test was terminated at the instance the value was five times as much as the initial vibration value and flaking was confirmed. Since the calculated life was 130 hours, the test termination time was defined as 500 hours, which corresponds to four times.

The result of the test is shown in Table 4.

In Examples 11 and 14, since the relieving degree for the working strain on the surface of the rolling element was increased by the re-tempering treatment, the L10 life was as long as 351 hours and 459 hours respectively which were about three times or more compared with that in Comparative Examples 11 to 16. However, since the residual stress value on the surface was also decreased as −600 Mpa and −800 Mpa, respectively, the effect of suppressing the propagation of cracks along with acceleration of internal fatigue by a high temperature test was also decreased and, accordingly, flaking was caused in 4/90 and 3/90 of the steel balls.

In Examples 13 and 21, since the relieving degree for working strain on the surface of the rolling element by the re-tempering treatment was decreased compared with other examples, while the residual compressive stress value at the 2% Da position was as high as −1000 and −800 MPa, respectively, the L10 life was 376 hours and 370 hours, which were about three times or more as long as Comparative Examples 11–16.

Further, in Examples 12 and 15, the working strain relieving on the surface of the rolling element was sufficient by the re-tempering treatment, the hardness of the rolling element was scarcely lowered and, with respect to L10 life, no flaking occurred in 90 pieces even reaching 500 hours.

Further, in Example 18, since the time for the surface hardening treatment was shortened as 30% of the prior art, the residual compressive stress at the 2% Da position could be decreased as −400 MPa. However, since the residual compressive stress value on the surface was also not sufficient as −800 MPa, propagation of cracks could not be suppressed sufficiently and the L10 life, was 487 hours at which flaking occurred in 3/90 pieces.

In Examples 16 and 17, since the peening time was shortened as 50% of the prior art and steel balls were charged more than twice than usual in the barrel box, to lower the collision energy between each of the steel balls, flaking did not occur even upon reaching 500 hours.

Further, in Examples 19 and 20, since the same working as in Examples 16 and 17 was applied and then secondary tempering was conducted again at 180° C. and 200° C., the indentation resistance and the suppression for the propagation of cracks were improved regarding the surface hardness and the residual stress distribution and flaking did not occur even upon reaching 500 hours.

In view of the result of the examples described above, it can be seen that the life evaluation time, was 500 hours, particularly, in each of Examples 15–17 and Examples 19 and 20, that is, they reached test termination time. That is, the residual compressive strength $\sigma_S$ on the surface of the rolling element (=$\sigma_2$) is desirably from −1000 to −1200 MPa on the side of the upper limit within the allowable range in the present invention for suppressing the propagation of cracks. On the other hand, the residual compressive stress $\sigma_D$ at the 2% Da position below the surface is desirably from −400 to −600 MPa on the side of the lower limit within the allowable range in the present invention in order to improve the fatigue strength and it is apparent that the best result can be obtained by the combination.

On the other hand, Comparative Example 11 is a test of using ordinary steel balls and, since the flaking strength was not enough under the high temperature test, flaking occurred in 9/90 pieces for the L10 life of 44 hours.

Further, in Comparative Examples 12 and 14, the re-tempering treatment was applied respectively at 150° C. and 180° C. but, since the working strain was not relieved sufficiently, the L10 life was 93 hours and 123 hours, respectively, which was shorter than the calculated life. This is because the relieving of the residual stress by the overworking was not relieved sufficiently and the plastic deformation due to rolling contact fatigue proceeded and, as a result, the life was shortened.

In Comparative Example 13, while the re-tempering treatment was applied at 280° C. and working strain was relieved sufficiently, the bearing hardness was lowered as HOURSC 56, and the residual compressive stress on the surface was also as low as −600 MPa, and the 2% Da was also as small as −300 MPa, so that propagation of cracks could not be suppressed sufficiently and, as a result, the L10 life was 57 hours.

Further, in Comparative Example 15, since the residual compressive stress at 2% Da after the surface effect treatment was as small as −300 MPa, propagation of cracks caused by the internal fatigue acceleration along with the high temperature test was not suppressed sufficiently. This is also the same in Comparative Example 16, in which the residual compressive stress on the surface was as low as −500 MPa, so that the effect of suppressing cracks propagating to the rolling surface was not enough and, further, the indentation resistance was neither sufficient. Accordingly, the L10 life was shortened as 68 hours and 71 hours, respectively.

From the foregoing results, it can be said that a longer life rolling element can be provided by improving the indentation resistance and flaking resistant performance by applying a surface hardening treatment (peening) after applying usual rough finishing, quenching and primary tempering and then further applying re-tempering (second tempering) to remove working strain, or by reducing the energy of ball peening than usual, thereby providing an optimal residual stress distribution in the manufacture of the rolling element.

While usual heat treatment for the bearing steels has been applied to the material used for the examples in this case, similar effects can also be recognized in the rolling element formed by applying carburization and carbonitridation treatment to steels, case hardening steels or like other materials that can be used as rolling elements.

Further, it provides an outstanding effect of extending the life by enhancing the material cleanliness of a rolling element thereby suppressing the amount of oxygen in the steels to 5 ppm or less and the amount of S to 30 ppm or less, thereby removing oxide series inclusions of 10 μm or more in a total detected surface area of 3200 mm$^2$ (total unit detection area for detecting the size of non-metal inclusions in the cross section of the coil material before manufacturing the steel balls).

Further, steel balls each of an identical size have been charged and treated in a barrel box upon surface hardening treatment, but it is also possible to charge steel balls of different sizes for surface hardening treatment thereby providing the initial residual compressive stress $\sigma_1$ (=−900 to −1500 MPa), and amount of initial residual austenite $\gamma_{R1}$ (=5 to 30 vol %) and, finally, to make the amount of the residual austenite $\gamma_{R2}$ on the surface of the completion product after finish working to 0 to 15 vol %, the residual compressive stress $\sigma_D$ at the 2% Da position below the surface to −400 to −1000 MPa and a residual compressive stress $\sigma_S=\sigma_2$ to −600 to −1200 MPa.

Further, referring to the secondary tempering of the rolling element, the secondary tempering treatment may be applied to the completion product in vacuum.

When the secondary tempering treatment is applied to the completed rolling element, an oxide film of 1 to 100 nm is formed to the surface of the rolling element. This oxide film has an effect of preventing hydrogen ions (H$^+$) formed upon intrusion of a water content in a lubricant from adsorption on the surface of steel balls and intruding as hydrogen atoms (H) into the steel ball.

Further, it also has an effect of improving the anti-seizure property when lubrication condition is deteriorated in a high temperature circumstance.

As has been described above according to the rolling bearing of the present invention, since the working strain in the surface layer of the rolling element tending to cause early flaking phenomenon more compared with the bearing ring is relieved by 10 to 60%, the rolling life of a rolling bearing used, particularly, in a circumstance undergoing high temperature, large loads and large vibrations can be extended greatly compared with the prior art.

Further, according to the method of working the rolling element of the present invention, since the surface hardening treatment is applied to a rolling element after quenching and tempering, plastic deformation treatment is further applied and then the secondary tempering is applied to moderate the residual stress value $\sigma_S$ on the surface to −600 to −1200 MPa, and make the residual stress value $\sigma_D$ at a Da×2% depth position below the surface relative to the diameter Da of the rolling element to a residual stress distribution within a range from −400 to −1000 MPa, the rolling life can be extended greatly compared with the prior art.

Accordingly, the rolling bearing according to the present invention can be utilized suitably as ball bearings for use in transmissions, hub units, engine auxiliaries (alternators, intermediate pulleys, solenoid clutches, etc.) of automobiles, guide roll bearings, backup bearings for use in iron and steel making, or bearings for use in railway vehicles.

What is claimed is:

1. A rolling bearing including a plurality of rolling elements disposed between a fixed ring and a rotational ring, wherein a final residual compressive stress value ($\sigma_S$) on a completed surface of the rolling element is from $-600$ to $-1200$ Mpa and a residual compressive stress value ($\sigma_D$) at a depth of 2% Da (Da=diameter of the rolling element) as a ratio to a diameter of the rolling element from the completed surface of the rolling element is from $-400$ to $-1000$ Mpa.

2. A rolling bearing as defined in claim 1, wherein an amount of residual austenite in a surface layer of the rolling element is from 0 to 15 vol %.

3. A method of working a rolling element disposed between a fixed ring and a rotational ring of a rolling bearing, comprising:

quenching and tempering a rolling element made of a bearing steel and then heat treating the rolling element to harden a surface thereof, mechanically working the rolling element by applying a plastic strain to the surface of the rolling element to provide a residual compressive stress on and below the surface of the rolling element after quenching and tempering, performing a secondary tempering step to relieve plastic strain after the mechanical working step, and finishing the surface of the rolling element to a predetermined size, wherein a relation between the residual compressive stress ($\sigma_1$ Mpa) on the surface of the rolling element caused by plastic working strain in the mechanical working step and residual compressive stress ($\sigma_2$ Mpa) on the surface of a completion product after the finishing step satisfies: $\{(\sigma_1-\sigma_2)/\sigma_1\} \times 100\% = 10$ to 60% and provision of the plastic working strain in the mechanical working step and relieving of the plastic strain in the secondary tempering step are applied.

4. A method of working a rolling element as defined in claim 3, wherein the residual compressive stress $\sigma_1 = -900$ to $-1500$ Mpa and the residual compressive stress $\sigma_2 = -600$ to $-1200$ Mpa.

5. A method of working a rolling element as defined in claim 3, wherein an amount of residual austenite on the surface of the rolling element after the quenching/tempering step is from 10 to 30% vol %, and an amount of residual austenite on the surface of the rolling element after the finishing step is from 0 to 15% vol %.

6. A method of working a rolling element as defined in claim 3, wherein a heating at 830 to 870° C. and an oil cooling and tempering at 130 to 160° C. are conducted in the quenching and tempering step and tempering at 150 to 240° C. is conducted in the secondary tempering step.

7. A method of working a rolling element as defined in claim 3, wherein a final residual compressive stress ($\sigma_S$ Mpa) on a surface of a completed product of the rolling element satisfies a relation:

$|\sigma_S| \geq |\sigma_D|$ when indicated by an absolute value for the residual compressive stress ($\sigma_D$ Mpa) at a depth of 2% Da (Da=diameter of the rolling element) as a ratio to the diameter of the rolling element from a surface of a completed product, and $|\sigma_D|=400$ to 1000 Mpa.

8. A method of working a rolling element as defined in claim 3, wherein the mechanical working step comprises the step of charging quenched/tempered steel balls in a space volume of a rotating barrel box and the step of applying plastic working strain to the surface of the steel balls.

9. A method of working a rolling element as defined in claim 4, wherein an amount of residual austenite on the surface of the rolling element after the quenching and tempering step is from 10 to 30 vol %, and an amount of residual austenite on the surface of the rolling element after the finishing step is from 0 to 15 vol %.

10. A method of working a rolling element as defined in claim 4, wherein a heating at 830 to 870° C. and an oil cooling and tempering at 130 to 160° C. are conducted in the quenching and tempering step and tempering at 150 to 240° C. is conducted in the secondary tempering step.

11. A method of working a rolling element as defined in claim 5, wherein a heating at 830 to 870° C. and an oil cooling and tempering at 130 to 160° C. are conducted in the quenching and tempering step and tempering at 150 to 240° C. is conducted in the secondary tempering step.

12. A method of working a rolling element as defined in claim 4, wherein a final residual compressive stress ($\sigma_S$ Mpa) on a surface of a completed product of the rolling element satisfies a relation:

$|\sigma_S| \geq |\sigma_D|$ when indicated by an absolute value for the residual compressive stress ($\sigma_D$ Mpa) at a depth of 2% Da (Da=diameter of the rolling element) as a ratio to the diameter of the rolling element from a surface of a completed product, and $|\sigma_D|=400$ to 1000 Mpa.

13. A method of working a rolling element as defined in claim 5, wherein a final residual compressive stress ($\sigma_S$ Mpa) on a surface of a completed product of the rolling element satisfies a relation:

$|\sigma_S| \geq |\sigma_D|$ when indicated by an absolute value for the residual compressive stress ($\sigma_D$ Mpa) at a depth of 2% Da (Da=diameter of the rolling element) as a ratio to the diameter of the rolling element from a surface of a completed product, and $|\sigma_D|=400$ to 1000 Mpa.

14. A method of working a rolling element as defined in claim 6, wherein a final residual compressive stress ($\sigma_s$ Mpa) on a surface of a completed product of the rolling element satisfies a relation:

$|\sigma_S| \geq |\sigma_D|$ when indicated by an absolute value for the residual compressive stress ($\sigma_D$ Mpa) at a depth of 2% Da (Da=diameter of the rolling element) as a ratio to the diameter of the rolling element from a surface of a completed product, and $|\sigma_D|=400$ to 1000 Mpa.

15. A method of working a rolling element as defined in claim 4, wherein the mechanical working step comprises the step of charging quenched/tempered steel balls for use in a predetermined rolling bearing in a space volume of a rotating barrel box and the step of applying plastic working strain to the surface of the steel balls by collision between each of the steel balls.

16. A method of working a rolling element as defined in claim 5, wherein the mechanical working step comprises the step of charging quenched/tempered steel balls for use in a predetermined rolling bearing in a space volume of a rotating barrel box and the step of applying plastic working strain to the surface of the steel balls by collision between each of the steel balls.

17. A method of working a rolling element as defined in claim 6, wherein the mechanical working step comprises the step of charging quenched/tempered steel balls for use in a predetermined rolling bearing in a space volume of a rotating barrel box and the step of applying plastic working strain to the surface of the steel balls by collision between each of the steel balls.

18. A method of working a rolling element as defined in claim 7, wherein the mechanical working step comprises the step of charging quenched/tempered steel balls for use in a predetermined rolling bearing in a space volume of a rotating barrel box and the step of applying plastic working strain to the surface of the steel balls by collision between each of the steel balls.

* * * * *